United States Patent Office 3,445,087
Patented May 20, 1969

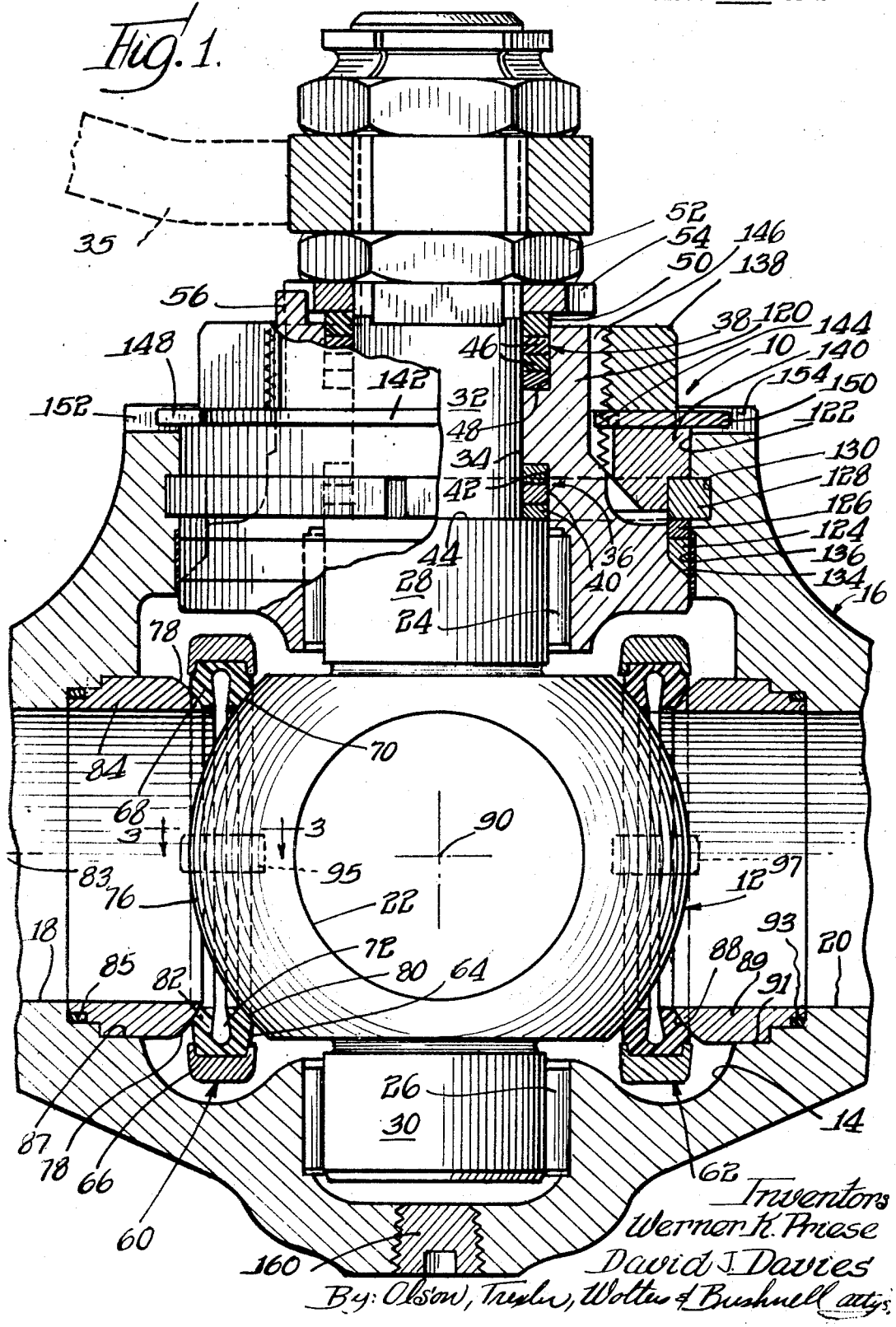

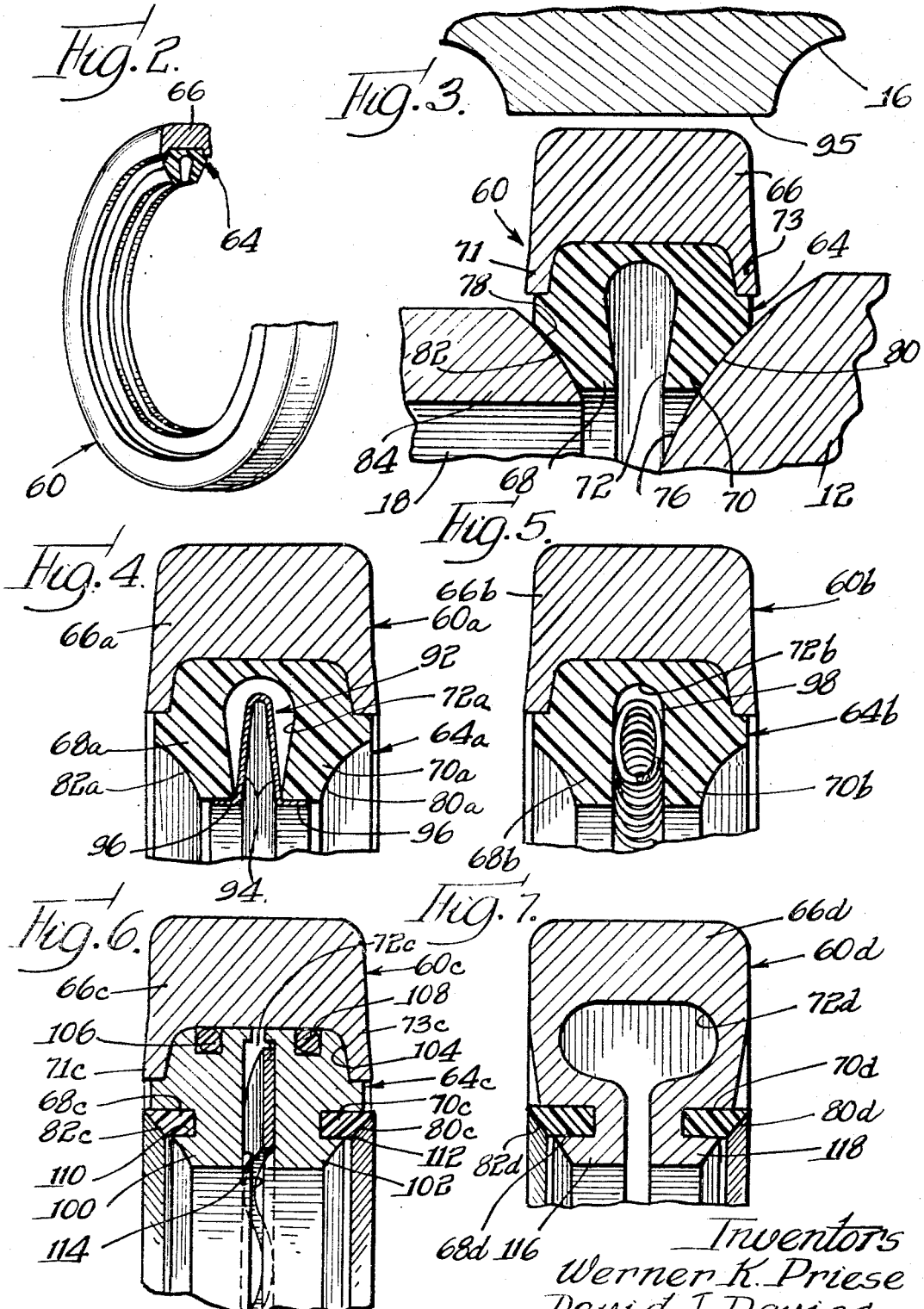

3,445,087
HIGH PRESSURE BALL VALVE
Werner K. Priese, Barrington, and David J. Davies, Naperville, Ill., assignors, by mesne assignments, to Hills-McCanna Company, Carpentersville, Ill., a corporation of Delaware
Filed Sept. 30, 1966, Ser. No. 583,306
Int. Cl. F16k 25/00, 5/20, 31/60
U.S. Cl. 251—172          17 Claims

ABSTRACT OF THE DISCLOSURE

A high pressure ball valve with an integral operating stem and a pair of spaced annular seals between the stem and the valve body; and a floating annular valve seat between a flow passage seat support surface and the ball valve and including a pair of radially inwardly extending annular seals cooperating, respectively, with the ball valve and the seat surface under the intensity of fluid pressure within the space between the annular seals.

---

The present invention relates to ball valves and particularly to ball valves adapted for high pressure fluid service.

The matter of constructing a ball valve, which will prevent high pressure fluid from leaking from the valve and which will prevent fluid from leaking through the valve when it is closed against high differential fluid pressure, has presented many complex, interrelated problems which are further complicated by economic considerations that restrict valve manufacturing costs that can be tolerated and by other factors, such as the desirability of limiting to a low value the torque required to turn the valve between its open and closed positions.

One object of the invention is to provide a ball valve which incorporates a valve stem integral with a valve ball journalled by body supported bearing structure and which has a new and improved construction that utilizes a particularly advantageous structural feature to seal the valve against leakage of fluid along the valve stem while at the same time providing a most effective and dependable sealing of the valve against the passage of fluid through the valve when it is closed, even against a high differential fluid pressure.

Another object is to provide a ball valve which is equipped with a valve ball journalled in body supporting bearing structure and which has a new and improved construction affording new and worthwhile advantages in sealing the valve against the passage of fluid therethrough when the valve is closed, while at the same time permitting the valve ball to be displaced within the valve body axially with respect to the axis of rotation of the ball without disturbing the effectiveness with which the closed valve is sealed against the passage of fluid therethrough.

Another object is to provide a ball valve having an improved construction which functions inherently to conform the intensity of seat sealing pressure to the degree of differential fluid pressure on the valve, even though the force of differential fluid pressure on the valve ball is sustained by body supported bearing structure for the ball, thereby avoiding excessive pressure of the valve seat structure on the valve ball while at the same time assuring, when the valve is closed, against different degrees of differential fluid pressure a seat sealing pressure that is adequate to prevent leakage through the valve.

A further object is to provide a ball valve having a novel construction which minimizes valve seat wear and the expended effort involved in opening and closing the valve and which, when closed, is effectively sealed on the upstream side of the ball against the flow of fluid therethrough by a seat sealing pressure that conforms in intensity to the differential fluid pressure on the ball.

Another object is to provide a ball valve and valve seat therefor which seals the valve, when closed, on the upstream side of the ball by a seat sealing pressure that conforms to the degree of differential fluid pressure on the valve and that is produced by dynamic action of the seat which is not subject to "sticking" or otherwise being immobilized or rendered ineffective by corrosion and the like.

A further object is to provide a ball valve and valve seat therefor which function to effectively seal the valve, when closed, on the upstream side of the valve ball by a seat sealing pressure which is dynamically conformed automatically to the degree of differential fluid pressure on the valve by a seat structure capable of withstanding considerable wear in use without significantly diminishing the effectiveness with which the valve is sealed.

A further object is to form in a ball valve a highly advantageous seal between the upstream side of the ball and the valve body by means of a "floating" valve seat comprising a highly effective sealing ring that is confined against radial expansion by an encircling outer ring and swelled axially by the differential pressure of fluid on the valve to produce a seat sealing pressure that is conformed in intensity to the degree of differential fluid pressure on the valve.

Another object is to provide a valve as recited in the preceding objects having an improved construction which significantly reduces the size and weight of the valve, in relation to prior valves of similar pressure capacity, while at the same time providing an inherent capability of the valve to withstand very high internal pressures in service without leakage or damage to the valve structure.

Other objects and advantages will appear from the following description of the exemplary embodiments of the invention illustrated in the drawings in which:

FIG. 1 is a partially sectioned side view of a ball valve forming one embodiment of the invention, end portions of the valve body being broken off to permit illustration of the valve structure on a larger scale;

FIG. 2 is a fragmentary perspective view of a valve seat used in the valve of FIG. 1;

FIG. 3 is a fragmentary sectional view on a greatly enlarged scale, taken along the line 3—3 of FIG. 1 and illustrating in radial section one valve seat and adjacent portions of the valve ball and valve body structure;

FIG. 4 is a radial sectional view on an enlarged scale of a modified valve seat;

FIG. 5 is a radial sectional view on an enlarged scale of a second modified valve seat;

FIG. 6 is a radial sectional view on an enlarged scale of a third modified valve seat; and FIG. 7 is a radial sectional view on an enlarged scale of a fourth modified valve seat.

Referring to the drawings in greater detail, the ball valve 10 embodying the invention and illustrated in FIG. 1 comprises a flow control ball 12 rotatably disposed in a valve chamber 14 defined within a valve body 16. Two flow passages 18, 20 defined in the valve body 16 open into the chamber 14 on opposite sides of the ball. The passage of fluid through the valve is controlled by rotation of the ball 12 to turn a flow passage or bore 22 in the ball 12 into and out of alignment with the body passages 18, 20.

The valve 10 is particularly well suited for service in controlling the flow of fluid under high pressure.

The ball 12 is journalled in body supported bearings 24, 26 which sustain the force of differential fluid pressure on the ball 12 when it is turned to its closed valve position illustrated in FIG. 1. Trunnions 28, 30 formed integrally with the ball 12 extend in opposite directions into the body supported bearings 24, 26 to journal the ball in the bearings.

The ball 12 is rotated by means of a rotatable control stem 32 extending out through a stem bore 34 in the body 16, as shown in FIG. 1. In this instance, the stem 32 is rotated to turn the ball by means of a handle 35 connected to the outer end of the stem.

A number of manufacturing and other advantages, well appreciated in this art, are obtained by forming the control stem 32 integrally with the ball 12. The integral ball 12, trunnions 28, 30 and stem 32 of the valve illustrated have a unitary or one-piece construction which affords worthwhile advantages, as intimated, in the manufacturing, servicing and use of a valve of this character.

It is very important in preventing the outward leakage of fluid along the stem 32, particularly when the valve is subjected to a high internal fluid pressure, that an effective and dependable seal be formed between the stem 32 and the encircling portion of the valve body 16. Moreover, the means used to assure an effectively leak-proof seal between the stem 32 and body 16 must provide for rotation of the stem relative to the body without imposing an undue torsional restraint on rotation of the stem.

The structure used in the valve 10 to preclude the leakage of fluid along the stem 32 serves this purpose to advantage. Yet, as will presently appear, the means used to seal the stem against the leakage of fluid along the stem has the inherent characteristic of permitting, in fact requiring, that the stem move axially somewhat when the valve is in service. With the stem 32 integrally connected with the valve ball 12, such axial displacement of the stem 32 necessarily displaces the ball 12 axially with respect to the stem 32 with the result that the position of the ball 12 along the axis of the stem 32 and in relation to the coacting valve body passages 18, 20 necessarily varies or changes while the valve is in service.

As will presently appear, the valve 10 is so constructed that axial displacement of the ball 12 incident to maintenance of effectiveness of the highly advantageous stem sealing construction used does not disturb the effectiveness with which the valve is sealed, when closed, against the leakage of fluid through the valve.

Having reference to FIG. 1 of the drawings, the stem 32 is sealed primarily by an interior annular seal 36 and an exterior seal 38, both of which are yieldable and axially compressible.

As shown, the interior seal 36 comprises three yieldable sealing rings 40 formed of a yieldable polymeric material, in this instance polytetrafluoroethylene, sold commercially under the trademark Teflon. Other yieldable materials which may be used to form the inner seal include reinforced polytetrafluoroethylene and asbestos stem packing. The yieldable inner sealing rings 40 are stacked together in tandem in encircling relation to the stem 32 and fit into an annular well 42 formed in the body 16 in encircling relation to the stem 32 and opening axially inward. The well 42 is conveniently formed as a counterbore, also denoted by the number 42, in the inner end of the valve stem bore 34 in the body 16.

The yieldable sealing rings 40 are compressed against the bottom of the well 42 by a radial shoulder or step 44 of substantially flat annular form that is integral with the stem 32. The shoulder or step 44 faces axially outward and forms an inner gland that is moved outwardly to compress the inner seal 36 by outward movement of the stem 32. In the preferred construction illustrated, the shoulder or gland 44 is formed by the outer end of the trunnion 28 which is integral with and somewhat larger in diameter than the portion of the stem 32 which continues outwardly from the gland 44.

The exterior or outer seal 38 is formed of three yieldable sealing rings 46 constructed of a yieldable polymeric material such, for example, as polytetrafluoroethylene, reinforced polytetrafluoroethylene, or asbestos stem packing. The yieldable rings 46 are stacked in encircling relation to the stem 32 and fit into an outwardly open annular well formed in the body 16 in encircling relation to the stem 32 by a counterbore 48 in the outer end of the stem receiving bore 34.

The yieldable seal 46 is compressed by an annular gland 50 encircling the stem 32 and fitting into the outer end of the well 42 in axially movable relation to the stem 32.

Both the yieldable inner stem seal 36 and the yieldable outer stem seal 38 are tightened simultaneously to the same degree by a single stem seal tightening nut 52 threaded onto stem 32. Upon tightening of the nut 52 on the stem 32, the nut 52 reacts axailly inward on the axially movable outer gland 50 to tighten the outer seal 38. At the same time, the nut 52 exerts an axially outward reaction of equal force on the stem 32 which causes the inner gland or shoulder 44 to tighten the inner seal 36 simultaneously with tightening of the outer seal 38 and to the same degree.

A limit stop plate 54 encircling the stem 32 in intervening relation between the outer gland 50 and seal tightening nut 52 is axially movable with respect to the stem 32 and rotates with the stem to cooperate with stop means 56 to locate the ball 12 in its open valve and closed valve positions respectively. In this instance, the stem 32 is rotated by the operating handle 35 connected to the stem outwardly of the seal tightening nut 52.

It will be evident that the position of the ball 12 along the axis of the stem 32 is determined by the axial thickness of the inner seal 36 which is variable. As previously intimated, the stem 32, inner gland 44 and ball 12 all must move axially outward with respect to the rotary axis of the stem to progressively tighten the inner seal 36. Moreover, the degree to which the ball 12 is displaced outwardly along the axis of the stem 32 increases in time as the stem 32 is adjusted outwardly to compensate for wear on the seal 36.

When the valve is turned to its closed position illustrated in FIG. 1, the valve is sealed against the passage of fluid through the valve by means of two "floating" valve seats 60, 62 encircling the inner ends of the respective body passages 18, 20.

Since the two seats 60, 62 are structurally identical in the valve illustrated, the rescription will be directed first to the construction and action of the seat 60.

The seat 60 comprises an inner sealing ring 64 confined radially by an encircling outer ring 66 formed preferably of metal and being effectively immune in this environment to circumferential and radial expansion. The inner sealing ring 64 comprises two coaxial annular seals 68, 70 extending radially inward from the outer ring 66 in axially spaced relation to each other to define therebetween an annular seat expanding chamber 72 opening radially inward between the two seals 68, 70. The two annular seals 68, 70 are sealably interconnected with each other within the outer ring 66 but outwardly of the intervening seat expanding chamber 72.

As shown in FIGS. 1, 2 and 3, the inner seat ring 64 is integrally formed in one piece from a tough yieldable polymeric material; such, for example, as polytetrafluoroethylene, sold commercially under the trademark Teflon; nylon; or polytrifluoromonochloroethylene, sold commercially under the trademark Kel-F. The outer periphery of the inner seat ring 64 is closely encircled by the outer ring 66 and axially embraced by two inwardly extending radial flanges 71, 73 on the outer ring 66. The inner seat ring 64, fashioned from such yieldable material, is U-shaped in radial section. Thus, the inner ring 64, U-shaped in radial section, has two annular sealing legs 68, 70 mutually joined together adjacent the encircling outer ring 66 and extending radially inward in axially spaced relation to each other to form the two annular seat seals previously denoted by the same reference numbers 68, 70.

The sealing leg 70 fits slidably against and forms a seal with the spherically curved exterior surface 76 of the ball 12 and the opposing sealing leg 68 forms a seal with an annular seat support surface 78 formed on the valve body 16 in encircling relation to the inner end of the passage 18.

The radial sealing surface 80 of the sealing leg 70 which confronts and sealably engages the ball surface 76 has, over a rather extensive portion of the radial width of the sealing leg 70, a spherical curvature conforming to the spherical curvature of the ball surface 76 so that the sealing surface 80 has a rather wide band of mutual engagement with the ball surface 76 which is effective for forming a seal between the sealing leg 70 and the ball.

The other sealing leg 68 of the inner seat ring 64 defines an outer radial sealing surface 82 having an annular form and spherical curvature making the sealing surface 82 a mirror image of the previously described sealing surface 80 on the sealing leg 70.

The outer sealing surface 82 on the sealing leg 68 fits sealably against the previously mentioned seat support surface 78 supported on the valve body 16 and constituting a sealing surface which forms a seal with the adjacent valve seat, as will presently appear. The seat support or sealing surface 78 is inwardly convex in shape. More particularly, it is shaped as an annular segment of a sphere having a curvature substantially equal to that of the exterior ball surface 76. The center 83 of curvature of the sealing surface 78 is located outwardly of the surface 78, as indicated in FIG. 1. Thus, it will appear that the body supported sealing surface 78 is substantially a mirror image of the opposing annular portion of the exterior ball surface 76 so that, when the valve is closed, the sealing relationship of the sealing surface 82 with the body supported sealing surface 78 is quite similar to that established between the sealing surface 80 and the adjacent ball surface 76.

Accurate machining of the body supported sealing surface 78 to have the spherical curvature desired is facilitated by forming this surface on a hollow cylindrical seat support 84 formed as a separate component of the body 16. The seat support 84 is machined to define the surface 78 and then fitted into a stepped counterbore 87 in the inner end of he passage 18 to encircle and define the inner portion of the passage 18. Assurance against the passage of fluid by leakage between the seat support 84 and the adjacent portion of the body 16 is provided by an O-ring seal 85 fitted in the bottom of the counterbore 87 in encircling relation to the outer end of the seat support, as shown in FIG. 1.

As previously indicated, the seat 62 in the valve 10 illustrated is structurally identical to the seat 60. It sealably engages the opposite side of the ball 12 and has sealing engagement with a second body supported sealing surface 88 formed on a cylindrical seat support 89, to be a mirror image of the body supported sealing surface 78. Structurally identical to the seat support 84, the seat support 89 is fitted into a stepped counterbore 91 in the inner end of the passage 20 and sealed to the encircling portion of the body by an O-ring 93.

When the valve is closed, the seat 60 continuously fits against both the sealing surface 78 and the ball 12 to form an effective seal between the body 16 and ball. At the same time, the seat 62 continuously engages the ball 12 and sealing surface 88 to form an effective seal between the ball and body.

Assuming, for example, that the seat 60 is on the upstream side of the ball 12, when the valve is closed, fluid under high pressure in the passage 18 enters the seat expansion or swelling chamber 72 in the upstream seat 60. The high pressure fluid in the seat expansion chamber 72 operates continuously to urge the opposed sealing legs 68, 70 away from each other to force the sealing surfaces 80, 82 on the respective sealing legs 70, 68 against the adjacent ball surface 76 and sealing surface 78 to provide a seat sealing pressure of the seat 60 against both the ball 12 and the sealing surface 78 which is progressively increased with increases in the pressure differential between fluid in the passage 18 and fluid in the chamber 14.

The fact that the seat sealing pressure on both the sealing surface 78 and the ball 12 is continuously conformed in intensity to the differential fluid pressure tending to force fluid past the seat makes the floating seat effective for preventing leakage of fluid past the seat even though the differential fluid pressure on the seat may be high. Moreover, this characteristic of the valve serves, when the differential fluid pressure blocked by the seat is lower, to avoid the application of excessive sealing pressure between the seat and the sealing surface 78 and between the seat and the ball 12.

Also, it will be appreciated that when the valve is fully open or in a partially open condition in the course of being turned between its fully open and closed position, the differential fluid pressure on the seat 60, for example, is either zero or greatly reduced in relation to the full differential fluid pressure which is blocked by the seat when the valve is fully closed. The fact that the seat sealing pressure is reduced to a relatively low residual value at all times except when the valve is fully closed affords the advantages of minimizing the consequent wear on the seat and energy expended as an incident to opening and closing the valve.

It will be appreciated that the mode of operation of the two structurally identical seats 60, 62 is the same. Having reference again to the means used to seal the valve, to advantage, against leakage of high pressure fluid along the control stem 32, it will be recalled that the inner seal 36, which determines the position of the ball 12 along its axis of rotation, is both yieldable and variable in thickness with the result that the axial position of the ball 12, with reference to its axis of rotation, may change while the valve is in service.

By virtue of the spherical curvature of the body supported sealing surfaces 78, 88 and the corresponding spherical curvature of the seat surfaces which engage the sealing surfaces 78, 88 and the spherical ball 12, displacement of the ball 12 along its axis of rotation does not disturb the established fit of the seat surfaces against the ball 12 and the surfaces 78, 88 which is so effective in sealing the closed valve against the passage of fluid past the seats.

However, displacement of the ball 12 along its axis of rotation as an incident to variation in thickness of the yieldable inner stem seal 36 does change the spacing of the center 90, FIG. 1, of curvature of the exterior ball surface 76 from the center 83 of curvature of the sealing surface 78. Such changing in the spacing of the curvature centers 90 and 83 from each other changes the axial width of the space between the the sealing surface 78 and ball surface 76 which must be spanned or bridged by the seat 60.

However, in the valve 10, the sealing legs 68, 70 of the seat 60, for example, move toward each other under externally applied load and are moved away from each other by the force of fluid pressure within the seat expanding chamber 72 to continuously conform the effective axial thickness of the seat to changes in the spacing between the ball center 90 and the center 83 of curvature of the coacting sealing surface 78. A similar action of the seat 62 serves to maintain a seal between the surface 88 and the ball 12 which is undiminished by displacement of the ball along its axis of rotation.

The seats 60, 62 are individually free to move in any radial direction with respect to the passages 18, 20, each seat being dynamically positioned by interfitting of the seats with the spherical ball and the spherical seat support surfaces 78, 88. Dislodgement of the seats 60, 62 from their operative positions as an incident to rotation of the ball is positively precluded at all times by a pair of motion limiting abutments 95 formed on the body 16 in opposing relation to each other and confronting the peripheral edge of the seat 60 in spaced relation thereto, as shown in FIGS. 1 and 2, and a similar pair of motion limiting abutments 97 formed on the body 16 and confronting the peripheral of the seat 62. Thus, the pairs of abutments 95 and 97 leave the seats 60, 62 free to "float" or move in any direction while continuously serving to keep the seats from being displaced out of their effective positions by rotation of the ball even in the event of any initial sticking of the seats to the ball surface.

A valve seat of modified construction is illustrated in FIG. 4. The valve seat illustrated in FIG. 4 and components of this modified seat, which are counterparts of the previously described seat 60, are identified with the same reference numbers with the addition of the suffix *a*. The seat 60*a* of FIG. 4 is generally similar in construction to the previously described seat 60 and is incorporated in the valve 10 in the same manner as the seat 60.

The seat 60*a* differs from the seat 60 described principally by the inclusion in the seat 60*a* of an annular spring 92 for yieldably urging the sealing leg portions 68*a*, 70*a* of the inner seat ring 64*a* away from each other to increase the residual sealing pressure of the seat surfaces 80*a*, 82*a* against the ball surface 76 and body supported sealing surface 78, for example. The spring 92 is annular in form and extends radially into the seat expanding chamber 72*a* as illustrated in FIG. 4. As viewed in radial section, FIG. 4, the spring 92 has a V-shape defined by two connected spring legs 94 diverging radially inward. Annular flanges 96 on the inner peripheries of the spring legs 94 fit against the inner peripheries of the sealing leg portions 68*a*, 70*a* to continuously locate the spring 92 in concentric relation to the seat 60*a* so that the spring exerts a circumferentially uniform spreading action on the sealing legs 68*a*, 70*a*.

Component elements of a second modified seat 60*b*, illustrated in FIG. 5, which are counterparts of similar components of the seat 60, are identified by the same reference numbers with the addition of the suffix *b*.

In the seat 60*b*, the sealing legs 68*b*, 70*b* are yieldably urged apart by an endless helical spring 98 fitted into the seat expanding chamber 72*b* and dimensioned so that the spring 98 is laterally flattened somewhat by its engagement with the two sealing leg portions 68*b*, 70*b* so that the spring has a residual stress continuously urging the sealing leg portions 68*b*, 70*b* apart to increase the residual sealing force of the seat 60*b* on the ball 12 and body supported sealing surface 78, for example.

Component elements of the modified seat 60*c* illustrated in FIG. 6, which are counterparts of similar components of the previously described seat 60, are identified by the same reference numbers with the addition of the suffix *c*.

The inner sealing ring 64*c* of the seat 60*c* is formed in two annular half sections 100, 102 shaped as mirror images of each other and turned back-to-back as illustrated. Both half sections 100, 102 of the inner ring 64*c* are axially movable within a relatively shallow, but axially broad groove 104 defined in the inner periphery of the outer seat ring 66*c*.

Both inner ring sections 100, 102 are slidably sealed to the encircling ring 66*c* by two O-rings 106, 108 fitted in the outer peripheries of the respective inner ring sections and slidably engaging the bottom of the relatively shallow groove 104. The sealing rings 68*c*, 70*c* are formed preferably of polytetrafluoroethylene or other suitable sealing material and fitted respectively into two annular grooves 110, 112 formed in the inner ring sections 100, 102 and opening axially outward.

A wavy or sinusoidal spring 114 of annular form is fitted between the two inner ring sections 100, 102 to urge the latter axially away from each other to a degree limited by engagement of the respective sections 100, 102 with the flanges 71*c*, 73*c* formed on the outer ring 66*c* and extending radially inward into embracing relation to the outer periphery of the inner sealing ring 64*c*.

The two inner ring sections 100, 102 which support the seals 68*c*, 70*c* have a combined axial thickness between the outer flanges 71*c*, 73*c* which is somewhat less than the axial spacing between the flanges 71*c*, 73*c* so that the inner ring sections 100, 102, urged apart by the intervening spring 114, are movable somewhat toward each other against the yieldable resistance of the spring.

The body structure of the inner ring sections 100, 102 which supports the seals 68*c*, 70*c*, as described, are formed from metal or other suitable material. It will be appreciated that the seat seal surfaces 80*c*, 82*c* are yieldably urged by the spring 114 against the ball surface 76 and the body supported surface 78, for example, when the seat is operatively disposed within the valve 10.

Component elements of the modified seat 60*d*, which form counterparts of the seat 60*c* described, are identified in FIG. 7 with the same reference numbers, but with the addition of the suffix *d*.

In the seat 60*d*, the seat seals 68*d*, 70*d* are supported, as shown, in two inner ring annular sections 116, 118 axially spaced apart and forming integral portions of the outer ring 66*d* extending radially inward from the main body of the outer ring 66*d* located radially outward of the seal expanding chamber 72*d*.

The outer ring 66*d* and the inwardly extending annular extensions of the ring 66*d* are integrally formed of spring metal which receives, upon assembly of the seat 66*d* into the chamber, a residual stress tending to urge the inner elements 116, 118 away from each other to produce a residual seat sealing pressure that is increased in the manner described by the seat swelling force of fluid pressure entering the seat expanding chamber 72*d*.

Access to the chamber 14 and the parts contained in the valve chamber 14 is obtained by removing a circular valve bonnet 120 forming a part of the body 16 and fitted into a circular bonnet receiving opening 122, as shown in FIG. 1.

The bonnet 120 is removably secured in its normal position in the bonnet receiving opening 122 in the body 16 in a manner such that the force of internal fluid pressure on the bonnet increases the effectiveness of an already effective seal formed between the bonnet and the encircling portion of the body.

As shown in FIG. 1, an annular seal 124 formed of a relatively soft metal or reinforced plastic is fitted into the bonnet receiving body opening 122 in encircling relation to the bonnet 120 and is held against axially outward displacement by an annular gland 126 intervening between the seal and a split anchoring ring 128 removably fitted into a circular anchor groove 130 cut into the bonnet opening 122. The axially inner side of the annular seal 124 has an inwardly diverging, truncated conical shape which fits against a similarly shaped annular shoulder or seal expanding surface 134 formed on the bonnet 120. The relatively soft seal 124, thus contained axially between the annular gland 126 and the conical seal expanding surface 134, is encircled by a cylindrical surface 136 on the valve body 16. To withstand severe service conditions, the relatively soft seal 124 can be made of metal and the body 16 can be manufactured to provide a surface 136 of increased hardness in relation to the main body structure.

The seal 124 is axially compressed between the gland 126 and the seal expanding shoulder or surface 134, which expands the seal 124 into firm sealing engagement with the encircling hardened surface 136.

This action is produced by tightening of a single seal tightening nut 138 threaded onto the outer end of the bonnet 120, as shown in FIG. 1. Tightening of the nut 138 causes the nut to apply an axially outward force through the bonnet 120 engaged by the nut to the seal expanding surface or shoulder 134. At the same time, the nut 138 applies an inward axial force of equal intensity to the gland 126 which acts inwardly on the seal 124. Such inward force is transmitted from the nut 138 to the gland 126 through the previously mentioned split anchoring ring 128, an axially thick thrust transmitting ring 140 encircling the bonnet 120 in engagement with the split ring 128 and a thrust washer 142 intervening between the thrust ring 140 and the nut 138. Both the thrust ring 140 and the thrust washer 142 are axially movable in relation to the bonnet 120.

The thrust washer 142 also serves to anchor the bonnet 120 against rotation in the body 16 while allowing axial displacement of the bonnet relative to the body. For this purpose, an inner tang 144 on the washer 142 extends into an axial groove 146 in the bonnet and two outward tangs 148, 150 on the washer extend into notches 152, 154 formed in the bonnet as shown.

Torque applied to the tightening nut 138 is transmitted to the body 16 by the anchoring thrust washer 142 so that the bonnet 120 is not rotated. The nut 138 is tightened as necessary to apply to the annular seal 124 equal and opposite axial forces having the strength necessary to provide the desired degree of tightening of the seal 124. This action of the tightening nut 138 applies to the split anchoring ring 128 only compressive force which does not significantly stress the anchoring ring 128 in shear.

It may be observed that the axially outward force of internal fluid pressure on the bonnet 120 does not diminish the effectiveness of the seal formed between the bonnet and body, but actually increases the effectiveness of the seal by increasing the axial force on the conical seal expanding surface 134 acting on the seal 124. This added axial force of fluid pressure on the bonnet 120 is met with a corresponding inward force applied to the seal 124 by the anchoring ring 128 anchored into the groove 130.

This construction provides an extremely sturdy and leakproof removable mounting of the bonnet 120 in the main portion of the body 16 while, at the same time, effectively minimizing the size and weight of the body structure required to contain a high internal fluid pressure without leakage.

It will be noted that the anchoring thrust washer 142 also serves to anchor the bonnet 120 against rotation by the torque applied to the stem 32 for the purpose of opening and closing the valve, the bonnet thus being held stationary while the control stem 32, trunnion 28 and other rotatable parts are turned to open and close the valve.

It will be appreciated that the two seats 60, 62 are equally effective for blocking the passage of fluid through the valve. The effectiveness of both seats 60, 62 can be tested at once by removing a drain plug 160 in the bottom of the valve body 16 allowing liquid to drain from the valve chamber 14. The fact that drainage of fluid from the chamber 14 stops after the chamber is initially emptied upon removal of the plug 160 establishes that both seats 60, 62 are effective, the ball 12 being turned to its closed valve position and fluid pressure being applied to the passages 18, 20 either simultaneously or alternately during the test in which the plug 160 remains removed.

The invention is claimed as follows:

1. A ball valve comprising, in combination, body means defining an internal valve chamber and two flow passages opening into said chamber, a flow control ball defining a bore therein and being disposed within said chamber, bearing means supported on said body means and journalling said ball for rotation within said chamber, said body means defining a control stem bore opening outwardly from said valve chamber in transverse relation to said passages, a control stem integrally joined to said ball and extending outwardly through said stem bore, means on the outer end of said stem for rotating the latter to turn said ball between open and closed valve positions thereof, said body means having a counterbore in the inner end of said stem bore defining an inner annular well encircling said stem and opening inwardly toward said valve chamber, an inner annular stem seal formed of a yieldable material and being disposed in said inner well in encircling relation to said stem, an inner seal compressor of annular form supported on said stem in coaxial relation thereto and extending into the inner end of said well into slidable engagement with said yieldable inner stem seal, said body means having a counterbore in the outer end of said stem bore defining an outer annular well encircling said stem and opening axially outward, an outer annular stem seal formed of a yieldable material and being disposed in said outer well in encircling relation to said stem, an outer seal compressor encircling said stem and extending into the outer end of said outer well into engagement with said outer stem seal, a seal tightening element threaded onto said stem to react inwardly on said outer seal compressor to force the latter inwardly against said yieldable outer stem seal, said seal tightening element reacting outwardly through said stem on said inner seal compressor to force the latter outwardly against said yieldable inner stem seal so that said inner and outer stem seals are tightened simultaneously and to the same degree and said ball has an axial position with respect to the axis of said stem that is determined by the axial thickness of said inner stem seal, means on said body means defining two annular seat support surfaces encircling the inner ends of said respective passages and being convex with spherical curvatures similar to the spherical curvature of said ball, two floating valve seats of annular form intervening between said respective seat support surfaces and said ball in encircling relation to the inner ends of said respective passages, each valve seat including an endless outer ring formed of metal and an endless inner ring closely encircled by said outer ring and being formed of a flexible polymeric material, said inner ring of each seat comprising first and second annular seals extending radially inward in axially spaced relation to each other to define therebetween an annular seat spreading space opening radially inward, said first and second seals of each seat defining on the sides thereof opposite from said annular space in the seat two annular sealing surfaces having concave spherical curvatures conforming to the convex spherical curvatures of the adjacent seat support surface and said ball, and said annular sealing surfaces of each seat slidably engaging respectively said ball and the adjacent seat support surfaces to form seals therewith that are intensified by fluid pressure within said annular space within said seat.

2. A high pressure ball valve comprising, in combination, a valve body defining an internal valve chamber and two flow passages opening into said chamber, a valve ball defining a flow bore therein and being disposed rotatably within said chamber, said ball and body including bearing means journalling the ball for rotation about an axis perpendicular to one of said passages, means on said body defining an annular seat support surface encircling the inner end of said one passage and being convex with a spherical curvature similar to the spherical curvature of said ball, a floating valve seat of annular form intervening between said annular seat support surface and said ball in encircling relation to the inner end of said one passage, said valve seat including an endless outer ring formed of metal and an endless inner ring closely encircled by said outer ring and being formed of a flexible polymeric material, said inner ring having a generally U-shape as viewed in transverse radial section; said inner ring, U-shaped in transverse radial section, having first and second leg portions extending radially inward in spaced relation to each other to define therebetween an annular seat spreading space opening radially inward; said first and second leg portions defining on the sides thereof opposite from said annular space two annular sealing surfaces having concave spherical curvatures conforming to the convex spherical curvatures of said seat support surface and said ball, said annular sealing surfaces slidably engaging respectively said ball and said annular seat support surface to form seals therewith that are intensified by outward spreading forces exerted on said respective leg portions by fluid pressure within said annular space, and said outer ring defining along opposite edges thereof two annular retaining lips extending radially inward in embracing relation to the outer periphery of said inner ring to restrain radial expansion of the radially outward portion of said inner ring by fluid pressure within said annular space therein.

3. A high pressure ball valve comprising, in combination, a valve body defining an internal valve chamber and two flow passages opening into said chamber, a valve ball defining a flow bore therein and being disposed rotatably within said chamber, means on said body defining an annular seat support surface encircling the inner end of one of said passages, a valve seat of annular form intervening between said annular seat support surface and said ball in encircling relation to the inner end of said one passage, said valve seat comprising an endless ring formed of a flexible polymeric material and having first and second annular leg portions extending radially inward in spaced relation to each other to define therebetween an annular seat spreading space opening radially inward, said first and second leg portions defining on the sides thereof opposite from said annular space two annular sealing surfaces engaging respectively said ball and said annular seat support surface to form seals therewith that are intensified by outward spreading forces exerted on said respective leg portions by fluid pressure within said annular seat spreading space, and reinforcing structure closely encircling the outer periphery of said endless ring to restrain the ring against radial expansion.

4. A high pressure ball valve comprising, in combination, a valve body defining an interval valve chamber and two flow passages opening into said chamber, a valve ball defining a flow bore therein and being disposed rotatably within said chamber, said ball and body including bearing means journalling the ball for rotation about an axis perpendicular to one of said passages, means on said body defining an annular seat support surface encircling the inner end of said one passage and being convex with a spherical curvature, a floating valve seat of annular form intervening between said annular seat support surface and said ball in encircling relation to the inner end of said one passage, said valve seat including an endless outer ring formed of metal and an endless inner ring closely encircled by said outer ring, said inner seat ring comprising first and second annular seals extending radially inward in spaced relation to each other to define therebetween an annular seat spreading space opening radially inward, said first and second seals defining on the sides thereof opposite from said annular space two annular sealing surfaces having concave spherical curvatures conforming to the convex spherical curvatures of said seat support surface and said ball, said annular sealing surfaces slidably engaging respectively said ball and said annular seat support surface to form seals therewith that are intensified by outward spreading forces exerted on said respective seals by fluid pressure within said annular space.

5. A high pressure ball valve comprising, in combination, a valve body defining an internal valve chamber and two flow passages opening into said chamber, a valve ball defining a flow bore therein and being disposed rotatably within said chamber, means on said body defining an annular seat support surface encircling the inner end of one of said passages, a valve seat of annular form intervening between said annular seat support and said ball in encircling relation to the inner end of said one passage and having limited bodily floating movement relative to the valve body, said valve seat comprising an endless outer element and two annular seal elements having a sealed relationship to said outer element and extending radially inward from said outer element in axially spaced relation to each other to define therebetween an annular seat spreading space opening radially inward, said first and second seal elements being movable axially away from each other by fluid pressure in said seat spreading space, and said seal elements defining on the sides thereof opposite from said annular space annular sealing surfaces engaging respectively said ball and said annular seat support surface to form seals therewith that are intensified by outward spreading forces exerted on said respective seal elements by fluid pressure within said annular seat spreading space.

6. A high pressure ball valve according to claim 5 in which said annular seal elements are integral with said endless outer element and in which said annular sealing surfaces are formed by two annular seals formed of yieldable polymeric material and supported in the sides of said seal elements confronting said ball and said annular seat support surfaces respectively.

7. A high pressure ball valve according to claim 5 in which said seal elements are urged axially away from each other by a coiled spring of annular form positioned in said seat spreading space between said seal elements in axially pressing engagement with both seal elements.

8. A high pressure ball valve according to claim 5 in which said seal elements are urged away from each other by spring means intervening therebetween and disposed in said annular seat spreading space.

9. A high pressure ball valve according to claim 8 in which said annular spring means has a sinusoidal annular form waving back and forth between said seal elements in spreading engagement with both seal elements.

10. A high pressure ball valve according to calim 8 in which said spring means is annular in form and has as viewed in radial section a V-shape diverging radially inward to engage both said seal elements in mutually spreading relation thereto.

11. A high pressure ball valve comprising, in combination, valve body means defining an internal valve chamber and two flow passages opening into said chamber, a valve ball defining a flow bore therein and being disposed rotatably within said chamber, said body means defining an annular seat support surface encircling the inner end of one of said passages, a valve seat of annular form intervening between said annular seat support surface and said ball in encircling relation to the inner end of said one passage, said valve seat comprising an endless outer element and two annular seal elements having a sealed relationship to said outer element and extending radially inward from said outer element in axially spaced relation to each other to define therebetween an annular seat spreading space opening radially inward, said first and second seal elements being movable axially away from each other by fluid pressure in said seat spreading space, said seal elements defining on the sides thereof opposite from said annular space annular sealing surfaces engaging respectively said ball and said annular seat support surface to form seals therewith that are intensified by outward spreading forces exerted on said respective seal elements by fluid pressure within said annular seat spreading space, said body means including a circular bonnet removably assembled in a circular bonnet opening in the body means, an annular seal disposed in said bonnet opening in encircling relation to said bonnet, said bonnet defining a annular seat expanding surface of inwardly diverging conical shape engaging the axially inward side of said seal, an annular gland anchored to said body means and engaging the axially outward side of said seal to hold the latter against outward displacement, a seal tightening nut threaded onto an outer portion of said bonnet to urge the bonnet outwardly upon tightening of the nut, thrust transmitting means intervening between said nut and said gland to transmit inward thrust from said nut to said gland so that tightening of said nut applies opposing compressive forces to said seal whereby said seal expanding surface expands the seal outwardly into sealing engagement with the encircling portion of said body means to provide a seal therewith which is intensified by the action of internal fluid pressure on said bonnet tending to urge the bonnet outwardly to increase the seal expanding action of said seal expanding surface on said seal.

12. A ball valve comprising, in combination, body means defining an internal valve chamber and two flow passages opening into said chamber, a valve ball defining a flow bore therein and being disposed rotatably in said chamber, bearing means supported on said body means and journalling said ball for rotation in said chamber, said body means defining an annular seat support surface encircling the inner end of one of said passages, a valve seat of annular form intervening between said annular seat support surface and said ball in encircling relation to the inner end of said one passage, said valve seat comprising an endless outer element and two annular seal elements having a sealed relationship to said outer elements and extending radially inward from said outer element in axially spaced relation to each other to define therebetween an annular seat spreading space opening radially inward, said first and second seal elements being movable axially away from each other by fluid pressure in said seat spreading space, and said seal elements defining on the sides thereof opposite from said seat spreading space annular sealing surfaces engaging respectively said ball and said annular seat support surface to form seals therewith that are intensified by outward spreading forces exerted on said respective seal elements by fluid pressure within said annular seat spreading space, and abutment means between said valve seat and said body means permitting limited floating movement of the valve seat while preventing displacement thereof out of effective position.

13. A ball valve according to claim 12 in which said seal elements are urged away from each other by spring means intervening therebetween.

14. A ball valve according to claim 13 in which said spring means has a sinusoidal annular form waving back and forth between said seal elements in spreading engagement with both seal elements.

15. A ball valve according to claim 13 in which said spring means constitutes a coiled spring of annular form positioned in said spreading space in engagement with both seal elements.

16. A ball valve according to claim 13 in which said spring means is annular in form and has two connected annular legs engaging said respective seal elements to yieldably urge the latter axially away from each other.

17. A ball valve comprising, in combination, body means defining an internal valve chamber and two flow passages opening into said chamber, a flow control ball defining a bore therein and being disposed within said chamber, said body means including a circular bonnet removably assembly therein and defining a control stem bore opening outwardly from said valve chamber in transverse relation to said passages, said bonnet being encircled by an annular seal which is in turn encircled by a portion of said body means defining said bonnet opening, said bonnet defining an annular seat expanding surface of inwardly diverging conical shape engaging the axially inward side of said seal to apply outward force thereto, an annular gland engaging the axially outward side of said seal to apply inward force thereto, an anchoring ring removably fitted into said body means to anchor said gland against outward displacement, a seal tightening nut threaded onto an outer portion of said bonnet to exert an outward force to the latter and to transmit an inward force to said gland to apply opposing compressive forces to said seal whereby said seal expanding surface expands the seal outwardly into sealing engagement with said body means to provide a seal therewith which is intensified by the action of internal fluid pressure on said bonnet tending to urge the bonnet outwardly to increase the seal expanding action of said seal expanding surface on said seal, a control stem integrally joined to said ball and extending outwardly through said stem bore, means on the outer end of said stem for rotating the latter to turn said ball between open and closed valve positions thereof, said body means defining an inner annular well encircling said stem and opening inwardly toward said valve chamber, an inner annular stem seal formed of a yieldable material and being disposed in said inner well in encircling relation to said stem, an inner seal compressor of annular form supported on said stem in coaxial relation thereto and extending into the inner end of said well into slidable engagement with said yieldable inner stem seal, said body means defining an outer annular well encircling said stem and opening axially outward, an outer annular stem seal formed of a yieldable material and being disposed in said outer well in encircling relation to said stem, an outer seal compressor encircling said steam and extending into the outer end of said outer well into engagement with said outer stem seal, a seal tightening element coacting with said stem for axial adjustment with respect thereto, said seal tightening element reacting inwardly on said outer seal compressor to force the latter inwardly against said yieldable outer stem seal, said seal tightening element reacting outwardly through said stem on said inner seal compressor to force the latter outwardly against said yieldable inner stem seal so that said inner and outer stem seals are tightened smiultaneously and to the same degree and said ball has an axial position with respect to the axis of said stem that is determined by the axial thickness of said inner stem seal, means on said body means defining two annular seat support surfaces encircling the inner ends of said respective passages and having convex curvatures, two floating valve seats of annular form intervening between said respective seat support surfaces and said ball in encircling relation to the inner ends of said respective passages, each valve seat including an endless outer element and first and second annular seal elements having a sealed relationship to said outer element and extending radially inward from said outer element in axially spaced relation to each other to define therebetween an annular seat spreading space opening radially inward, said first and second seal elements being movable axially away from each other by fluid pressure in said seat spreading space, and said first and second seal elements of each seat defining on the sides thereof opposite from said annular space in the seat two annular sealing surfaces slidably engaging respectively said ball and the adjacent seat support surface to form seals therewith that are intensified by fluid pressure within said annular space within the seat.

References Cited

UNITED STATES PATENTS

| | | | |
|---|---|---|---|
| 2,201,895 | 5/1940 | Glen | 251—172 |
| 2,509,656 | 5/1950 | Tomoser | 251—172 |
| 3,096,786 | 7/1963 | Bost | 251—315 XR |
| 3,122,352 | 2/1964 | Anderson | 251—174 XR |
| 3,166,291 | 1/1965 | Grove | 251—174 XR |
| 3,252,684 | 5/1966 | Ksieski | 251—174 XR |
| 3,266,769 | 8/1966 | Shand | 251—174 |

FOREIGN PATENTS 1,117,958  11/1961  Germany.

HAROLD W. WEAKLEY, *Primary Examiner.*

U.S. Cl. X.R.

251—214, 315, 317